(12) United States Patent
Shiizaki et al.

(10) Patent No.: US 8,620,327 B2
(45) Date of Patent: Dec. 31, 2013

(54) BASE TRANSCEIVER STATION

(75) Inventors: Kotaro Shiizaki, Kawasaki (JP);
Ryusuke Kiryu, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 482 days.

(21) Appl. No.: 12/577,291

(22) Filed: Oct. 12, 2009

(65) Prior Publication Data

US 2010/0029333 A1 Feb. 4, 2010

Related U.S. Application Data

(63) Continuation of application No. PCT/JP2007/058110, filed on Apr. 12, 2007.

(51) Int. Cl.
*H04W 36/00* (2009.01)

(52) U.S. Cl.
USPC ..... 455/441; 455/450; 455/452.1; 455/452.2; 455/253

(58) Field of Classification Search
USPC .......................................... 455/441, 450–453
See application file for complete search history.

(56) References Cited

U.S. PATENT DOCUMENTS

| | | | |
|---|---|---|---|
| 6,128,327 A * | 10/2000 | Bird et al. ...................... | 375/132 |
| 7,082,155 B1 | 7/2006 | Ogami | |
| 7,480,519 B2 * | 1/2009 | Jeong et al. .................... | 455/525 |
| 8,005,058 B2 * | 8/2011 | Pecen ............................ | 370/338 |
| 2002/0082012 A1 * | 6/2002 | Wang et al. .................... | 455/435 |
| 2003/0125040 A1 | 7/2003 | Walton et al. | |
| 2005/0147078 A1 | 7/2005 | Arima et al. | |
| 2006/0039318 A1 * | 2/2006 | Oh et al. ........................ | 370/328 |
| 2006/0068801 A1 * | 3/2006 | Usuda et al. ................... | 455/450 |
| 2006/0121946 A1 | 6/2006 | Walton et al. | |
| 2006/0209669 A1 * | 9/2006 | Nishio ........................... | 370/208 |
| 2006/0240860 A1 * | 10/2006 | Benco et al. ................ | 455/550.1 |
| 2007/0155323 A1 * | 7/2007 | Matsumoto et al. ............ | 455/39 |
| 2009/0307567 A1 * | 12/2009 | Tsunehara et al. ............. | 714/794 |

FOREIGN PATENT DOCUMENTS

| | | |
|---|---|---|
| JP | 2000-232671 | 8/2000 |
| JP | 2001-053672 | 2/2001 |
| JP | 2002-027522 | 1/2002 |
| JP | 2003-124854 | 4/2003 |
| JP | 2004-007087 | 1/2004 |
| JP | 2005-509360 | 4/2005 |
| JP | 2006-060814 | 3/2006 |
| JP | 2006-074265 | 3/2006 |
| JP | 2007-028230 | 2/2007 |
| WO | 2005/020488 | 3/2005 |

OTHER PUBLICATIONS

International Search Report for corresponding International Patent Application No. PCT/JP2007/058110, with a mailing date of May 15, 2007.

(Continued)

*Primary Examiner* — Lester Kincaid
*Assistant Examiner* — Mehmood B Khan
(74) *Attorney, Agent, or Firm* — Fujitsu Patent Center

(57) ABSTRACT

A base transceiver station performing communications with user equipment, includes a receiving unit to receive an uplink transmission signal containing a propagation path fluctuation value between a self-device and the user equipment from the user equipment; and a communication permitting unit to control a period of time during which a permission of communications is given to the user equipment based on the propagation path fluctuation value.

7 Claims, 12 Drawing Sheets

(56) References Cited

OTHER PUBLICATIONS

English Translation of International Preliminary Report with Written Opinion on the patentability of corresponding International Patent Application No. PCT/JP2007/058110, mailed Oct. 22, 2009.

Japanese Patent Office "Notice of Reason for Rejection" issued for corresponding Japanese Patent Application No. 2009-510676, mailed Oct. 11, 2011. English translation attached.

* cited by examiner

BASE TRANSCEIVER STATION

CROSS-REFERENCE TO RELATED APPLICATION

This is a continuation of Application PCT/JP2007/058110, filed on Apr. 12, 2007, now pending, the contents of which are herein wholly incorporated by reference.

FIELD

The present invention relates to a scheduler for wireless communications, in which a base transceiver station performs bidirectional communications with plural pieces of user equipment.

BACKGROUND

FIG. 11 is a diagram illustrating an example of a wireless communication system in which a base transceiver station performs bidirectional communications with plural pieces of user equipment. A scheduler is indispensable for the wireless communication system where the base transceiver station conducts the bidirectional communications with plural pieces of user equipment (users). As disclosed in Patent document 1, the schedulers control allocation (permission) of the communications to the user equipment and the base transceiver station by use of various items of information acquired in the user equipment and the base transceiver station or by use of fed-back information.

Herein, such a down link communication system is considered that the scheduler on the side of the base transceiver station carries out user allocation (gives a permission of the communications to the user equipment).

FIG. 12 is a diagram illustrating a concept of the down link communication system, in which the scheduler on the side of the base transceiver station conducts the user allocation (gives the permission of the communications to the user equipment).

In this system, the scheduler gives the permission of the communications to the user equipment (UE: User Equipment) based on downlink information fed back through a just-anterior uplink frame from the individual user and a variety of parameters acquired in the base transceiver station (BTS: Base Transceiver Station). Methods using a variety of algorithms were contrived about the allocation (the permission of the communications) to the user equipment and the base transceiver station.

Herein, the discussion on the case where the scheduler exists on the side of the base transceiver station has been made, however, the operation is also the same with respect to a case where the scheduler exists on the side of the user equipment.

[Patent document 1] Japanese Unexamined Patent Publication No. 2005-509360

SUMMARY

In a wireless communication system as depicted in FIG. 12, the user equipment obtains a CQI (Channel Quality Indicator) parameter such as SIR (Signal-to-Interference Ratio) by employing a channel estimation value, and feeds back this parameter to the base transceiver station. The parameter is affected by a propagation path fluctuation when performing the communications. In the conventional wireless communication system, the permission of the communications is given based on the variety of parameters to the user equipment, however, scheduling is not carried out in a way that takes into consideration the propagation path fluctuation between the user equipment and the base transceiver station. Therefore, in a propagation environment having a large propagation path fluctuation, the fed-back parameter does not follow up the actual propagation path fluctuation, which might lead to a decline of wireless characteristics and a decrease in throughput. Further, in a propagation environment having a small propagation path fluctuation, the permission of the communications is given without leaving a sufficient time interval as the case may be. In this case, a problem is that a sufficient time-diversity effect is not acquired when retransmitted.

It is an object of the present invention to provide a wireless transmitting/receiving device which executes scheduling in the way of taking into the consideration a propagation path fluctuation between a base transceiver station and user equipment.

The present invention adopts the following means in order to solve the problems given above.

The present invention is a base transceiver station performing communications with user equipment, including: a receiving unit to receive an uplink transmission signal containing a propagation path fluctuation value between a self-device and the user equipment from the user equipment; and a communication permitting unit to control a period of time during which a permission of communications is given to the user equipment based on the propagation path fluctuation value.

The permission of the communications can be given by employing the propagation path fluctuation value between the base transceiver station and the user equipment.

According to the present invention, deterioration in error rate of the communications can be prevented by giving the permission of the communications while using the propagation path fluctuation value.

Still further, in addition to the configuration described above, the base transceiver station further includes: a propagation path fluctuation value storage unit stored with the past propagation path fluctuation values; and a propagation path fluctuation value predicting unit predicting and calculating the present propagation path fluctuation value based on the past propagation path fluctuation values stored in the propagation path fluctuation value storage unit, wherein the communication permitting unit gives the permission of the communications to the user equipment based on the propagation path fluctuation value predicted by the propagation path fluctuation value predicting unit.

According to the present invention, a next propagation path fluctuation value is predicted from the past propagation path fluctuation values, whereby the base transceiver station can give the permission of the communications more precisely.

Yet further, the present invention is a base transceiver station performing communications with user equipment, including: a receiving unit receiving, from the user equipment, an uplink transmission signal containing a propagation path fluctuation value between a self-device and user equipment; a propagation path fluctuation value calculating unit calculating the propagation path fluctuation value between the user equipment and the self-device by use of the uplink transmission signal; and a communication permitting unit giving a permission of communications to the user equipment based on the propagation path fluctuation value.

According to the present invention, the base transceiver station calculates the propagation path fluctuation value, thereby enabling a hardware configuration of the user equipment to be simplified.

The communication permitting unit according to the present invention includes a scheduler.

According to the present invention, it is feasible to provide the wireless transmitting/receiving device which executes the scheduling in the way of taking account of the propagation path fluctuation between the base transceiver station and the user equipment.

DESCRIPTION OF EMBODIMENTS

An embodiment of the present invention will hereinafter be described with reference to the drawings. Configurations in the following embodiments are exemplifications, and the present invention is not limited to the configurations in the embodiments.

First Embodiment

Configuration

In a base transceiver station and pieces of user equipment in a first embodiment, the base transceiver station conducts communications in a way that switches over the user equipment as a communication destination by permitting the user equipment to perform the communications.

(User Equipment)

Figure 2:
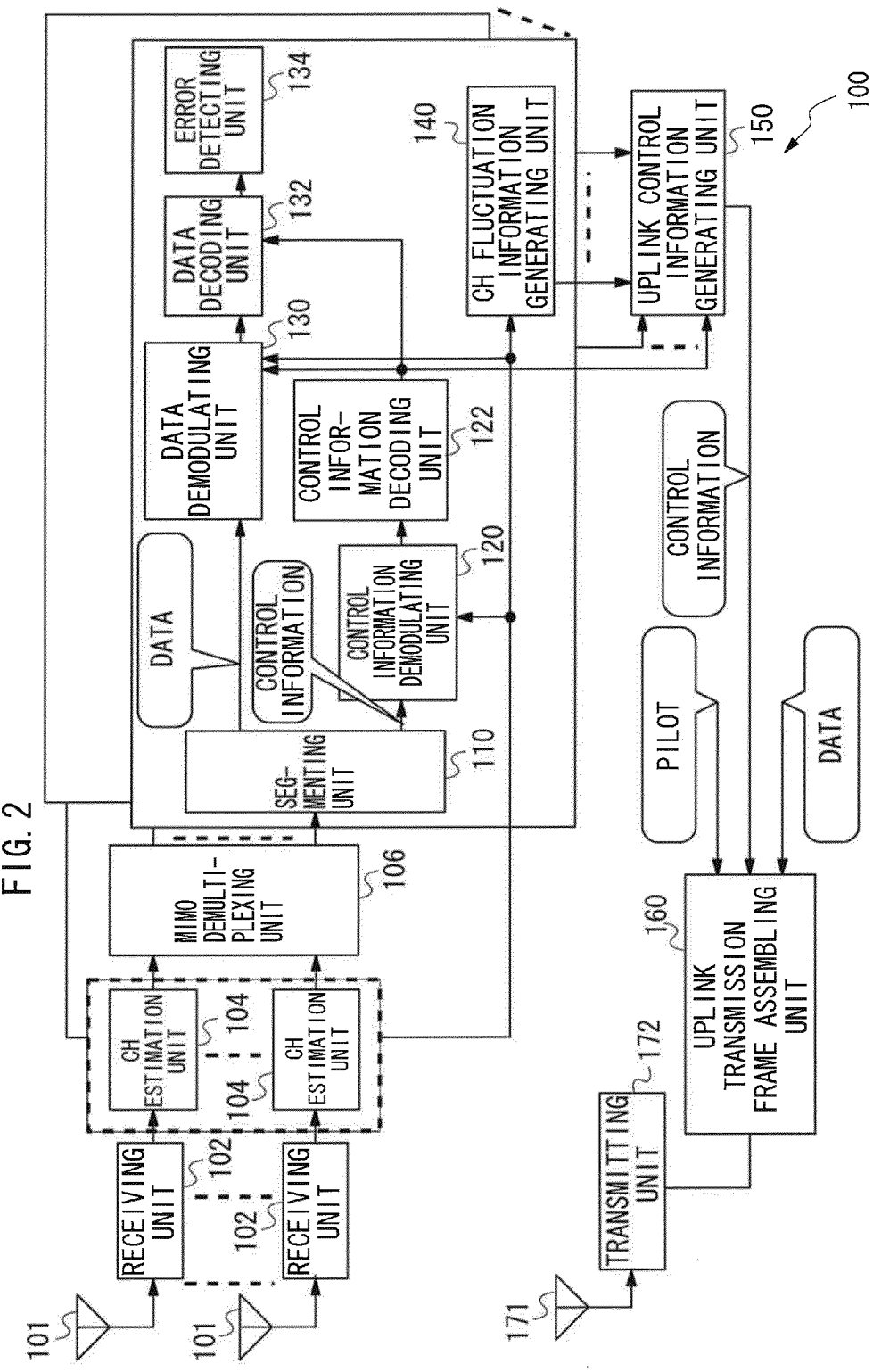
FIG. 2 is a diagram illustrating an example of a configuration of a receiving side of the user equipment in the first embodiment.

FIG. 2 is a diagram illustrating an example of a configuration mainly on a receiving side of the user equipment in the first embodiment. User equipment 100 in the first embodiment includes a receiving antenna 101, a receiving unit 102, a channel (CH: Channel) estimation unit 104, a MIMO (Multi Input Multi Output) demultiplexing unit 106, a segmenting unit 110, a control information demodulating unit 120, a control signal decoding unit 122, a data demodulating unit 130, a data decoding unit 132, an error detecting unit 134, a channel (CH: channel) fluctuation information generating unit 140, an uplink control signal generating unit 150, an uplink transmission frame assembling unit 160, a transmitting unit 172 and a transmitting antenna 171.

The receiving unit 102 of the user equipment 100 receives a signal from a base transceiver station 200 via the receiving antenna 101. The channel estimation unit 104 carries out channel estimation by use of pilot information of the received signal. The MIMO demultiplexing unit 106 performs MIMO demultiplexing by use of a channel estimation value obtained by the channel estimation unit 104. The MIMO-demultiplexed signal is each segmented by the segmenting unit 110 into a control information signal and a data signal. The control information signal is demodulated by the control information demodulating unit 120, then decoded by the control signal decoding unit 122 and transmitted to the data demodulating unit 130 and to the data decoding unit 132. The data signal is demodulated by the data demodulating unit 130 in the way of using the control information and the channel estimation value. Further, the demodulated data is decoded by the data decoding unit 132 in a way that employs the control information, and is transmitted to the error detecting unit 134.

Further, the channel estimation unit 104 of the user equipment 100 sends the channel estimation value to the channel fluctuation information generating unit 140. The channel fluctuation information generating unit 140 obtains a propagation path fluctuation value from the channel estimation value etc, then stores the fluctuation value in the uplink control information, and transmits the control information containing this value to the transmitting side (the base transceiver station).

Figure 3:
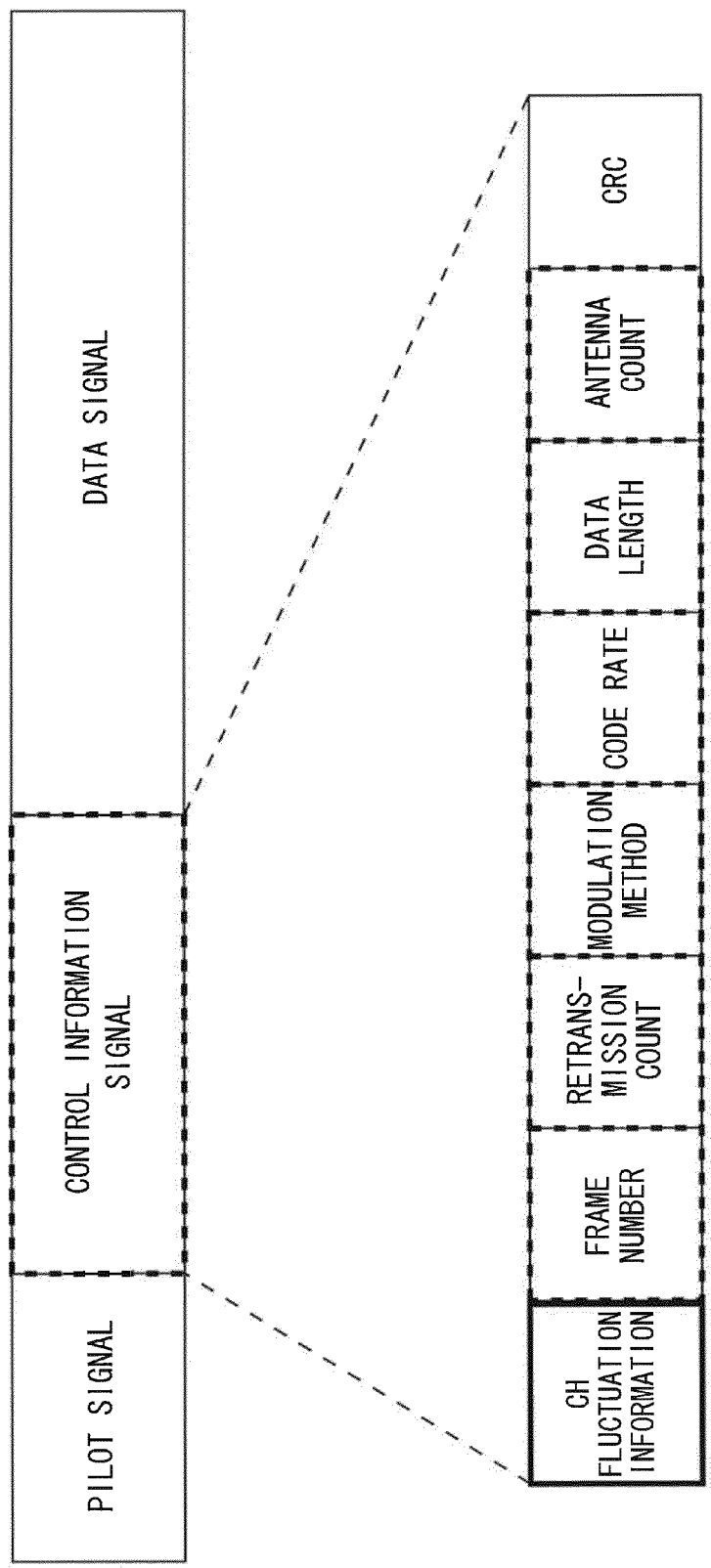
FIG. 3 is a diagram illustrating an example of an uplink transmission format of the user equipment in the first embodiment.

FIG. 3 is a diagram illustrating an example of an uplink transmission frame format of the uplink transmission signal. The uplink transmission signal includes a pilot signal, a control information signal and a data signal. The control information signal contains channel (CH) fluctuation information, a frame number, a retransmission count, a modulation method, a code rate, a data length, a number of antennas, CRC (Cyclic Redundancy Check), etc.

(Base Transceiver Station)

Figure 4:
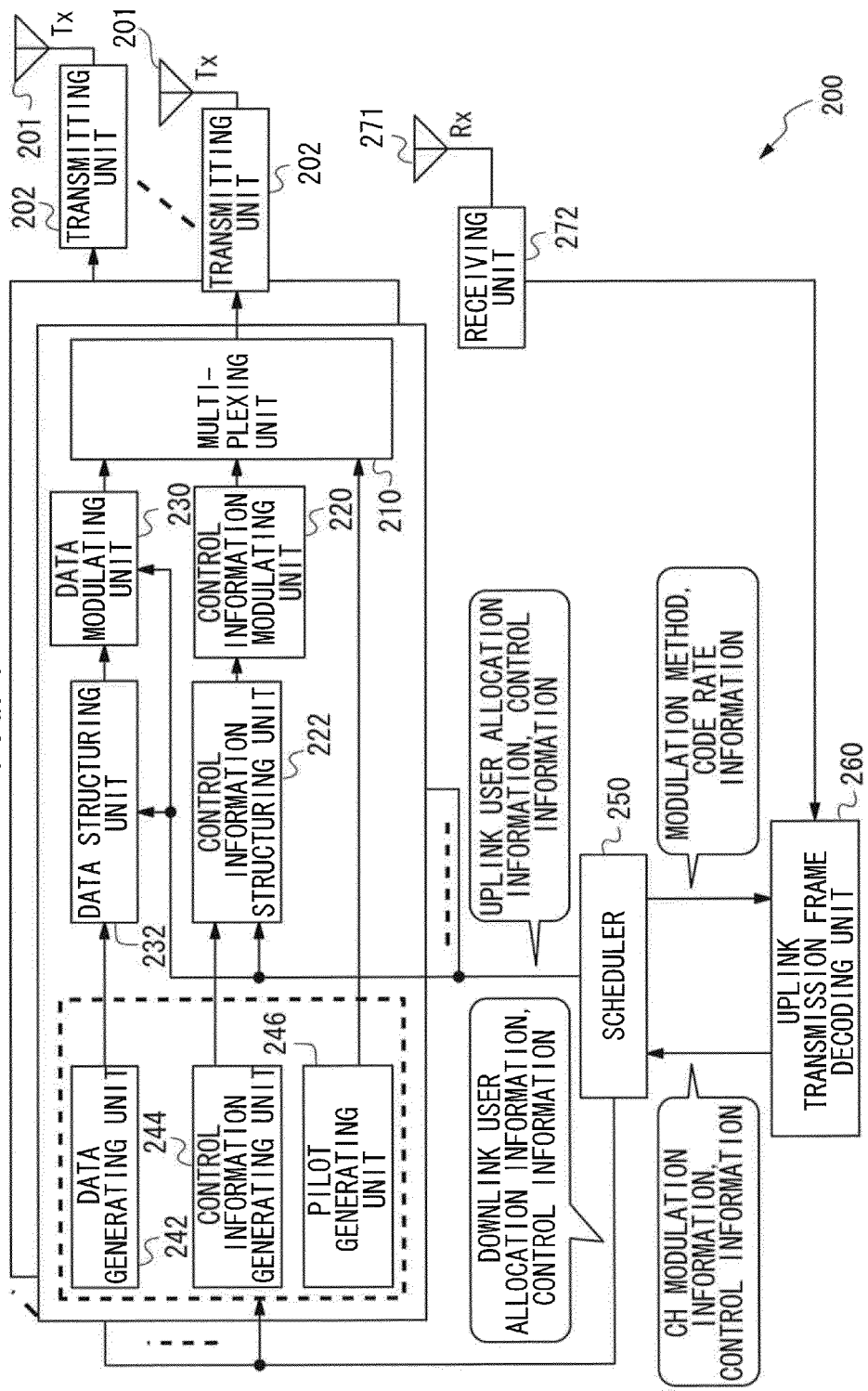
FIG. 4 is a diagram illustrating an example of a configuration of a transmitting side of the base transceiver station in the first embodiment.

FIG. 4 is a diagram illustrating an example of a configuration mainly on the transmitting side of the base transceiver station in the first embodiment. The base transceiver station 200 in the first embodiment includes a data generating unit 242, a control signal generating unit 244, a pilot generating unit 246, a data structuring unit 232, a data modulating unit 230, a control information structuring unit 222, a control information modulating unit 220, a multiplexing unit 210, a transmitting unit 202, a transmitting antenna 201, a scheduler 250, an uplink transmission frame decoding unit 260, a receiving unit 272 and a receiving antenna 271.

Figure 5:
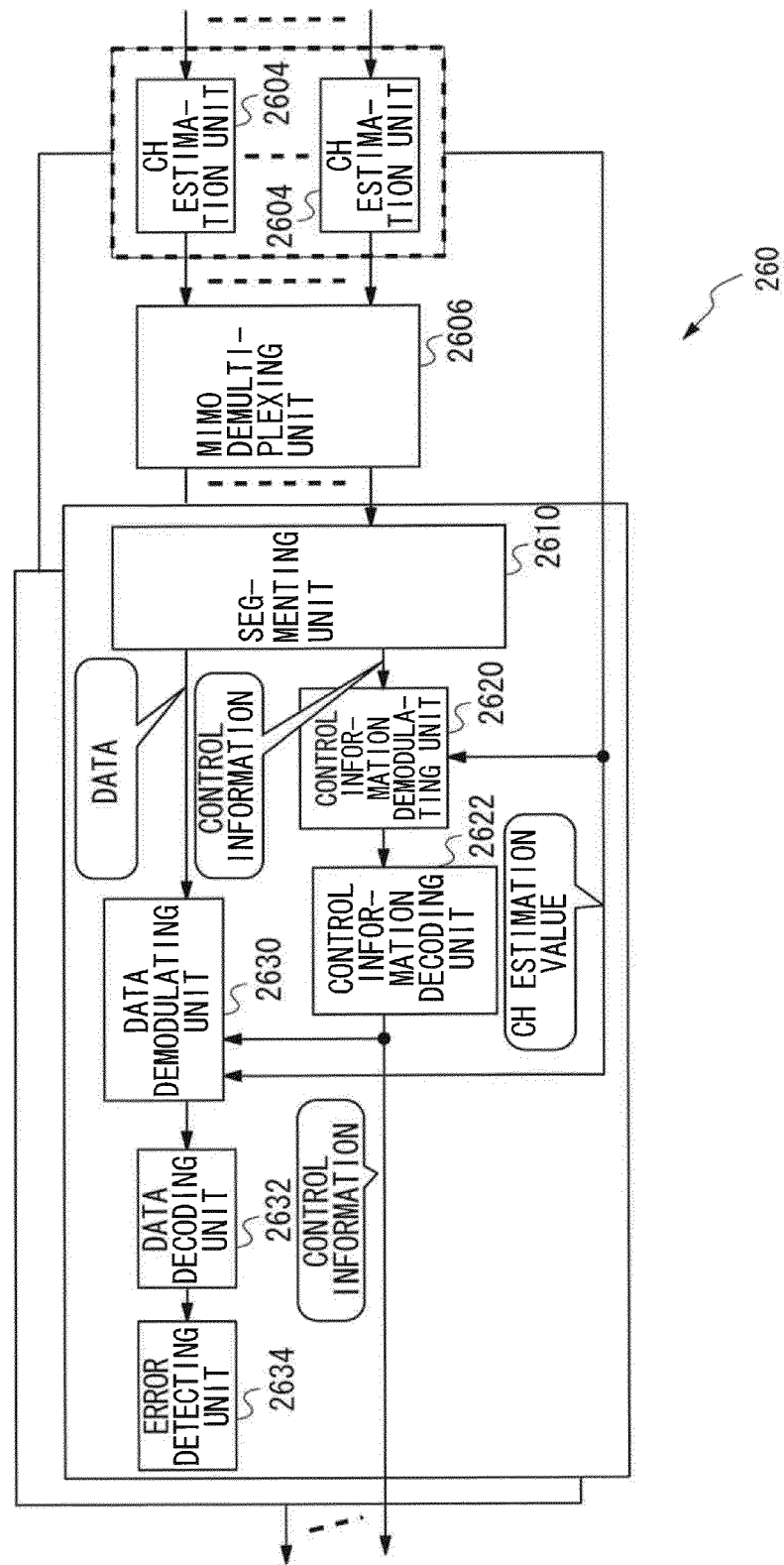
FIG. 5 is a diagram illustrating an example of a configuration of an uplink transmission frame decoding unit of the base transceiver station in the first embodiment.

FIG. 5 is a diagram illustrating an example of a configuration of the uplink transmission frame decoding unit of the base transceiver station in the first embodiment. The uplink transmission frame decoding unit 260 of the base transceiver station 200 in the first embodiment includes a channel (CH) estimation unit 2604, a MIMO demultiplexing unit 2606, a segmenting unit 2610, a control information demodulating unit 2620, a control information decoding unit 2622, a data demodulating unit 2630, a data decoding unit 2632 and an error detecting unit 2634.

The receiving unit 272 of the base transceiver station 200 receives the signal from the user equipment 100 via the receiving antenna 271. The uplink transmission frame decoding unit 260 decodes the signal received by the receiving unit 272 and extracts the control information. The scheduler 250 collects the propagation path fluctuation value (channel (CH) fluctuation information) contained in the control information from each user (the user equipment), and executes scheduling by use of the collected pieces of fluctuation values.

A parameter (the propagation path fluctuation value) used for the propagation path fluctuation is exemplified such as a Doppler frequency, a fading phase rotational quantity, a moving speed of the user equipment and each of a time derivative. The Doppler frequency is obtained by taking an inner product (scalar product) of the channel estimation value of the sub-carrier at a specified time interval. An absolute value of the Doppler frequency can be also utilized as a substitute for the Doppler frequency.

The base transceiver station 200 multiplexes the respective signals such as the pilot signal, the control information signal and the data signal, then transmission-frame-formats the signal, and transmits the thus-formatted signal to the user equipment 100 permitted for the communications owing to the scheduling.

Operational Example

An operational example of the scheduler of the base transceiver station in the first embodiment will be explained.

Figure 1:
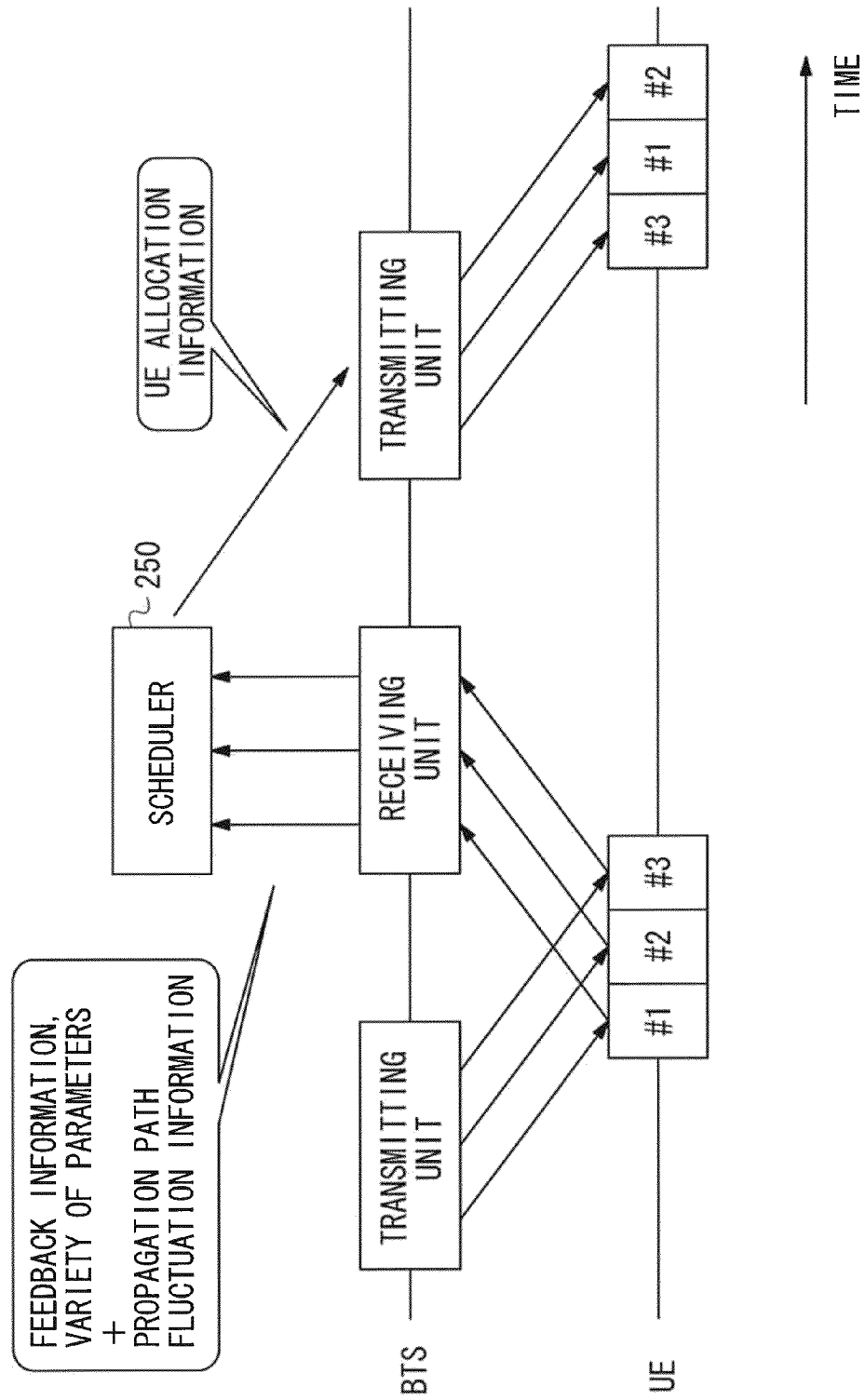
FIG. 1 is a diagram illustrating how a scheduler of a base transceiver station in a first embodiment controls communications between user equipment and the base transceiver station.

FIG. 1 is a schematic diagram illustrating the operational example of the scheduler of the base transceiver station in the first embodiment. The scheduler 250 of the base transceiver station 200 in the first embodiment collects information (e.g., the Doppler frequency) with respect to the propagation path fluctuation, which is contained in the uplink transmission signal from the user (the user equipment). The scheduler 250 permits the user (the user equipment) having a large propagation path fluctuation value to perform the downlink communications. The example in FIG. 1 is that the scheduler 250 resultantly preferentially permits user equipment #3 having the large propagation path fluctuation value to conduct the communications. Further, user equipment #2 having a small propagation path fluctuation value is given the permission of the communications in postponement resultantly.

Figure 6:
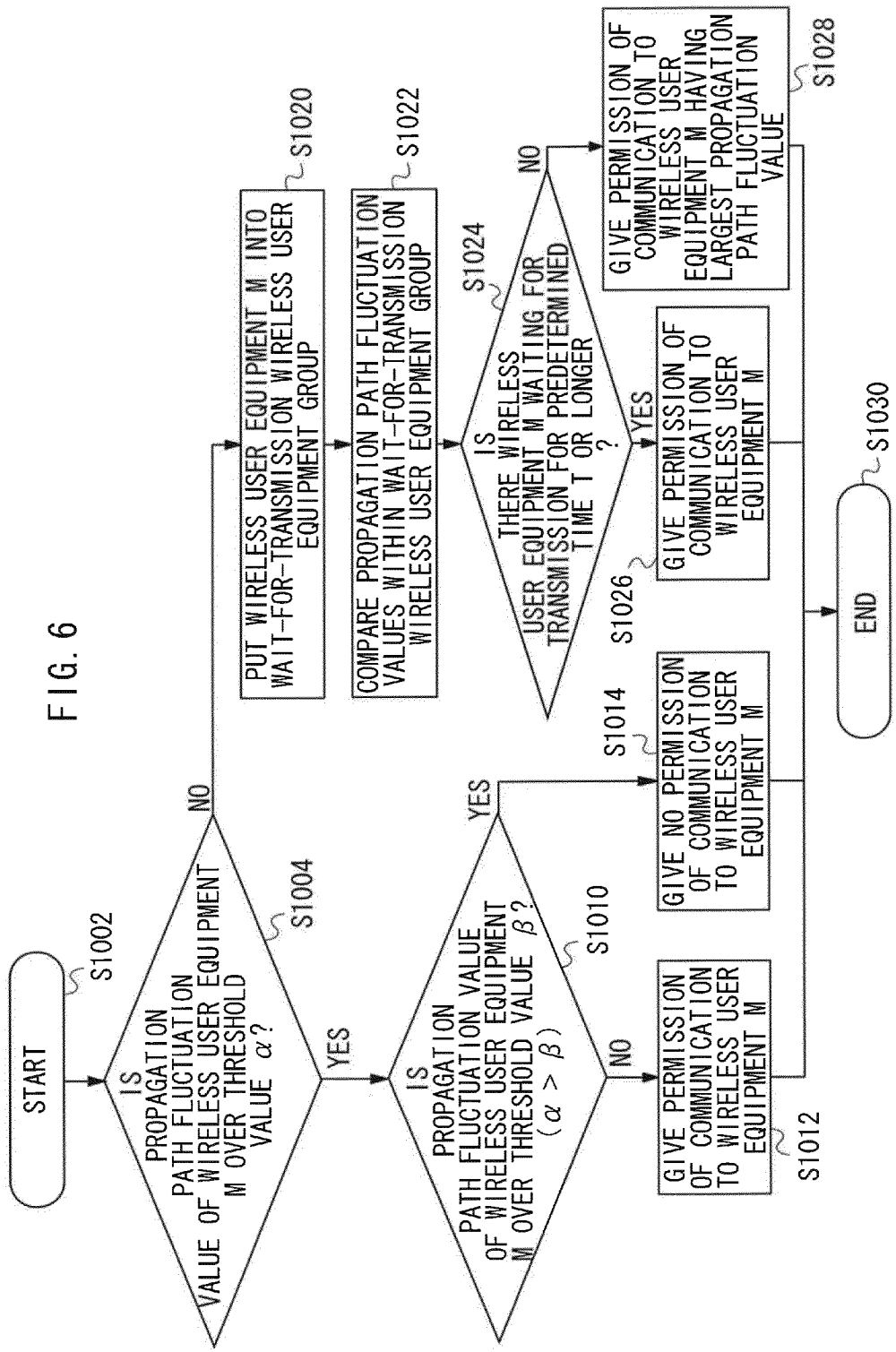
FIG. 6 is a diagram illustrating a flowchart of an example of a scheduling algorithm of a scheduler of the base transceiver station in the first embodiment.

FIG. 6 is a diagram illustrating a flowchart of an example of a scheduling algorithm by the scheduler of the base transceiver station in the first embodiment.

The scheduler 250, when the control information containing the propagation path fluctuation value, which has been transmitted by the user equipment (that is herein assumed to be user equipment M), is inputted from the uplink transmission frame decoding unit 260, starts scheduling for the communications (S1002). The scheduler 250 determines whether the propagation path fluctuation value (e.g., the Doppler frequency) contained in the control information sent from the user equipment M exceeds a specified threshold value α or not. If the propagation path fluctuation value exceeds the specified threshold value α (S1004; YES), the scheduler 250 further determines whether the propagation path fluctuation value exceeds a specified threshold value β (β>α) or not. The scheduler 250, if the propagation path fluctuation value exceeds the specified threshold value β (S1010; YES), does not give the permission of the communication to the user equipment M (S1014). Furthermore, the scheduler 250, if the propagation path fluctuation value does not exceed the specified threshold value β (S1010; NO), gives the permission of the communication to the user equipment M (S1012). Whereas if the propagation path fluctuation value exceeds the specified threshold value β, the scheduler 250 decides that a quality of the communications may not be kept acceptable because of a highly unstable state of the propagation path between the base transceiver station 200 and the user equipment M, and does not give the permission of the communications (S1014).

Looping back to step S1004, if the propagation path fluctuation value of the user equipment M is not over the threshold value α (S1004; NO), the permission of the communications is not given to the user equipment M. At this time, the propagation path between the base transceiver station 200 and the user equipment M is considered to be stable. This is, it is considered, because the quality of communications is not affected even when postponing the communications with the user equipment M. Moreover, a sufficient time-diversity effect is acquired by enlarging the communication time interval.

The scheduler 250 stores the information of the user equipment M in a wait-for-transmission user equipment group (S1020). The scheduler 250 is stored with the wait-for-transmission user equipment group. Herein, the scheduler 250 stands by for the communications with the user equipment M.

The scheduler 250 compares the propagation path fluctuation values contained in the pieces of control information of the pieces of user equipment within the wait-for-transmission user equipment group (S1022).

The scheduler 250 determines whether or not the wait-for-transmission user equipment group includes the user equipment (assumed to be the user equipment N) waiting for the transmission for a specified period of time T or longer (S1024).

The scheduler 250, if the wait-for-transmission user equipment group includes the user equipment N waiting for the transmission for the specified period of time T or longer (S1024; YES), gives the permission of transmission to the user equipment N (S1026). The reason why so is that if the preferential permission of the transmission is not given to the user equipment waiting for the transmission for the specified period of time T or longer, the quality of communications with the user equipment might decline due to an excessively enlarged time interval of the communications with the user equipment.

The scheduler 250, if the wait-for-transmission user equipment N does not exist for the specified period of time T or longer (S1024; NO), gives the permission of the transmission to the user equipment having the largest propagation path fluctuation value in the wait-for-transmission user equipment group (S1028).

The same scheme may be attained by using the absolute value of the propagation path fluctuation value and the time derivative of the propagation path fluctuation value in place of the propagation path fluctuation value itself.

Further, another method is that the absolute value of the propagation path fluctuation value is previously compared with a preset specified threshold value, it is determined that the propagation path fluctuation is large if equal to or larger than the specified threshold value, then it is determined to give the permission of the communication as described above by use of the propagation path fluctuation value, and, if less than the specified threshold value, it is determined to give the permission of the communication as stated above by use of the time derivative of the propagation path fluctuation value.

<Operation and Effect of the Embodiment>

According to the first embodiment, deterioration in error rate can be prevented by enhancing a follow-up performance after the propagation path fluctuation with respect to the user equipment having the large propagation path fluctuation value. Further, in regard to the user equipment having the small propagation path fluctuation value, the time-diversity effect when retransmitted can be increased by leaving a communication interval.

Second Embodiment

Figure 7:
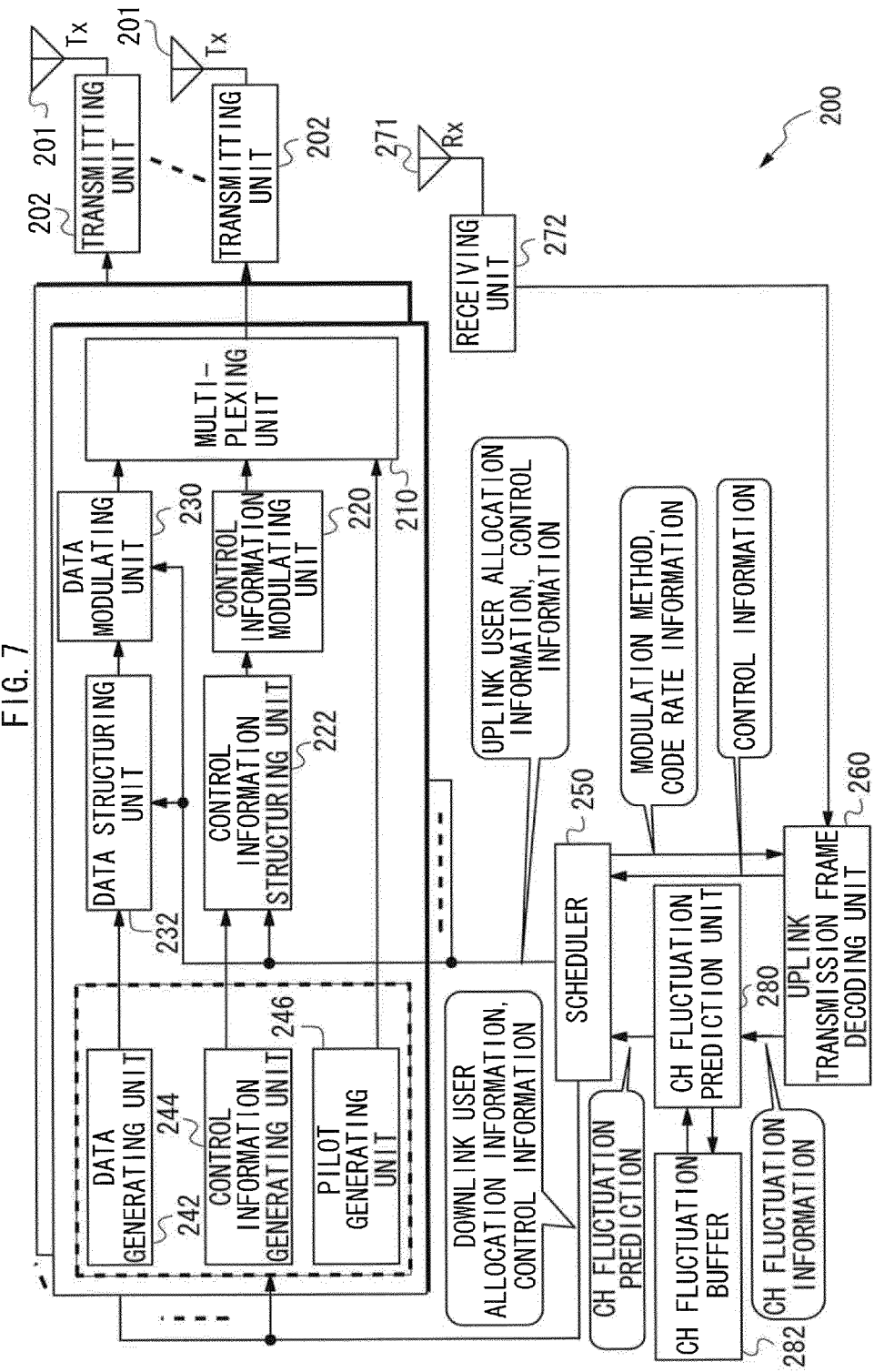
FIG. 7 is a diagram illustrating an example of a configuration mainly on the transmitting side of the base transceiver station in a second embodiment.

Next, a second embodiment of the present invention will hereinafter be described. The second embodiment has common points to the first embodiment. Accordingly, the discussion will be focused on different points, while the description of the common points is omitted.
<Configuration>
(User Equipment)
The user equipment in the second embodiment is the same as the user equipment in the first embodiment illustrated in FIG. 2.
(Base Transceiver Station)
FIG. 7 is a diagram illustrating an example of a configuration chiefly on the transmitting side of the base transceiver station in the second embodiment. The base transceiver station 200 in the second embodiment includes the data generating unit 242, the control information generating unit 244, the pilot generating unit 246, the data structuring unit 232, the data modulating unit 230, the control information structuring unit 222, the control information modulation unit 220, the multiplexing unit 210, the transmitting unit 202, the transmitting antenna 201, the scheduler 250, the uplink transmission frame decoding unit 260, a channel (CH) fluctuation prediction unit 280, a channel (CH) fluctuation buffer 282, a receiving unit 272 and a receiving antenna 271.

The propagation path fluctuation value decoded by the uplink transmission frame decoding unit 260 and transmitted from the user equipment is accumulated in the channel fluctuation buffer 282 on a per-user equipment basis. The channel fluctuation prediction unit 280 gives the permission of the communication to the user equipment by taking into consideration the propagation path fluctuation values (e.g., the Doppler frequency) of several past frames accumulated in the channel fluctuation buffer 282.

The channel fluctuation prediction unit 280 extracts the propagation path fluctuation values, for past three frames, accumulated in the channel fluctuation buffer 282. The channel fluctuation prediction unit 280 averages the extracted propagation path fluctuation values for the past three frames. An extraction frame count may be properly changed. The channel fluctuation prediction unit 280 transmits the averaged propagation path fluctuation value as channel fluctuation predicting information to the scheduler 250.

Further, the channel fluctuation prediction unit 280 may obtain the channel fluctuation predicting information (propagation path fluctuation value) in the following manner.

Figure 8:
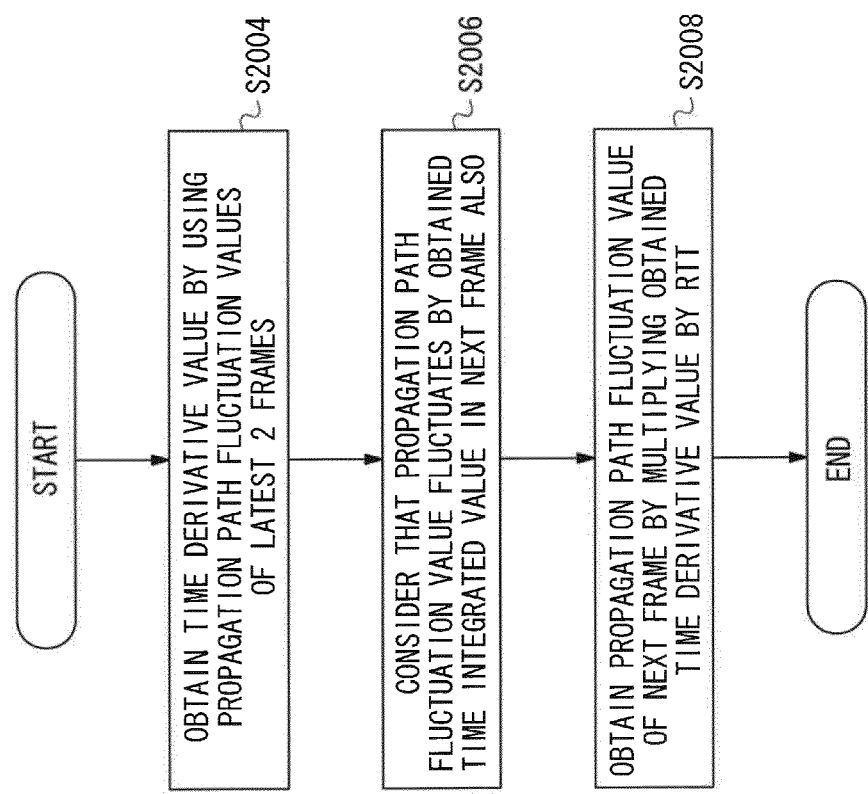
FIG. 8 is a diagram illustrating a flowchart of one example of a prediction of a propagation path fluctuation in the second embodiment.

FIG. 8 is a diagram illustrating a flowchart of one example of a prediction of the propagation path fluctuation. The channel fluctuation prediction unit 280 extracts the propagation path fluctuation values, for past two frames, accumulated in the channel fluctuation buffer 282. The channel fluctuation prediction unit 280 obtains a difference (a time derivative value) of the extracted propagation path fluctuation values (S2004). The channel fluctuation prediction unit 280 considers that the propagation path fluctuation value of the next frame will change by the same quantity as the time derivative value (S2006), thereby predicting the propagation path fluctuation value of the next frame (S2008). The thus-predicted propagation path fluctuation value is expressed as follows. Herein, the propagation path fluctuation value at time t is defined as below.

$$f(t)$$ [Mathematical Expression 1]

The time derivative thereof is given as below.

$$\frac{df(t)}{dt} = f'(t)$$ [Mathematical Expression 2]

Let $t_1$, $t_2$, $t_3$ ($t_1 < t_2 < t_3$) be timings of the respective frames, the time derivative at the timing $t_2$ is given as follows I the consideration of the past two frames.

$$f'(t_2) = \frac{f(t_2) - f(t_1)}{t_2 - t_1}$$ [Mathematical Expression 3]

The propagation path fluctuation value of the next frame is predicted as below by use of this mathematical expression 3.

$$f(t_3) = f(t_2) + f'(t_2) \cdot \Delta t$$ [Mathematical Expression 4]

Note that a value of RTT (Round Trip Time) can be used for $\Delta t$.

Further, a propagation path fluctuation curve can be also predicted based on the least square method by use of the propagation path fluctuation value of the existing frame.

The channel fluctuation prediction unit 280 can obtain a prediction value of the propagation path fluctuation value by employing these values.

Operational Example

An operational example of the scheduler 250 is the same as the operational example of the scheduler in the first embodiment.

The scheduler 250 conducts scheduling by use of the averaged propagation path fluctuation value calculated by the CH fluctuation prediction unit 280.
<Operation and Effect of the Embodiment>
According to the second embodiment, the present propagation path fluctuation value is predicted from the past propagation path fluctuation values transmitted from the user equipment, whereby the base transceiver station can more precisely give the permission of the communications to the user equipment.

Third Embodiment

Next, a third embodiment of the present invention will be explained. The third embodiment has common points to the first and second embodiments. Accordingly, the discussion will be focused on different points, while the description of the common points is omitted.

Figure 9:
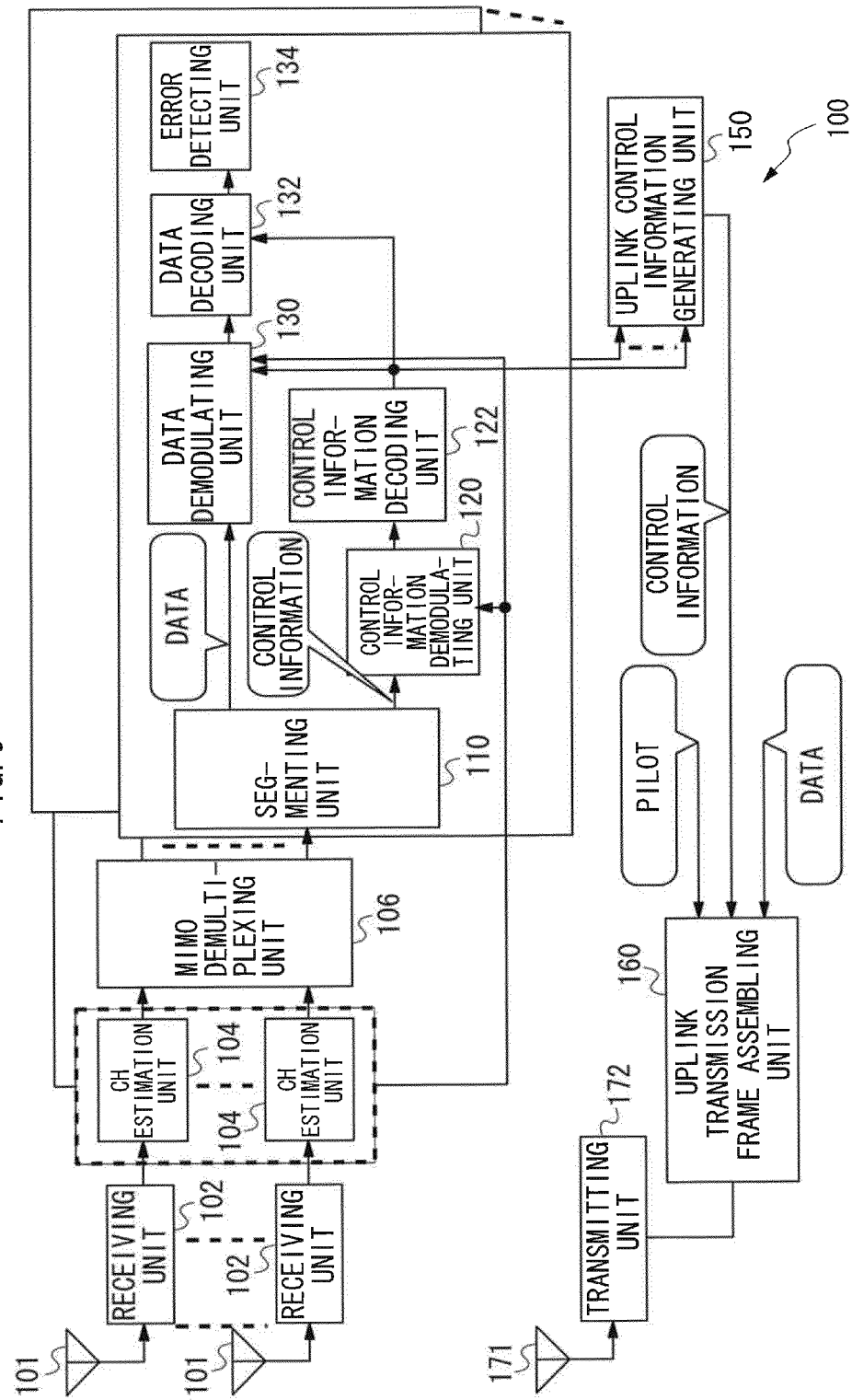
FIG. 9 is a diagram illustrating an example of a configuration mainly on the receiving side of the user equipment in a third embodiment.

In the third embodiment, the base transceiver station calculates the propagation path fluctuation value between the pieces of user equipment.
<Configuration>
(User Equipment)
FIG. 9 is a diagram illustrating an example of a configuration mainly on a receiving side of the user equipment in the third embodiment. The user equipment 100 in the third embodiment includes the receiving antenna 101, the receiving unit 102, the channel (CH: Channel) estimation unit 104, the MIMO (Multi Input Multi Output) demultiplexing unit 106, the segmenting unit 110, the control information demodulating unit 120, the control information decoding unit 122, the data demodulating unit 130, the data decoding unit 132, the error detecting unit 134, the uplink control information generating unit 150, the uplink transmission frame assembling unit 160, the transmitting unit 172 and the transmitting antenna 171.

The user equipment 100 in the third embodiment does not include the channel fluctuation information generating unit 140 held by the user equipment 100 in the first embodiment and can therefore have a much simpler configuration than the user equipment 100 (FIG. 2) in the first embodiment.

(Base Transceiver Station)

The configuration chiefly on the transmitting side of the base transceiver station in the third embodiment can be set the same as the configuration on the transmitting side of the base transceiver station depicted in FIG. 4 in the first embodiment or FIG. 7 in the second embodiment.

Figure 10:
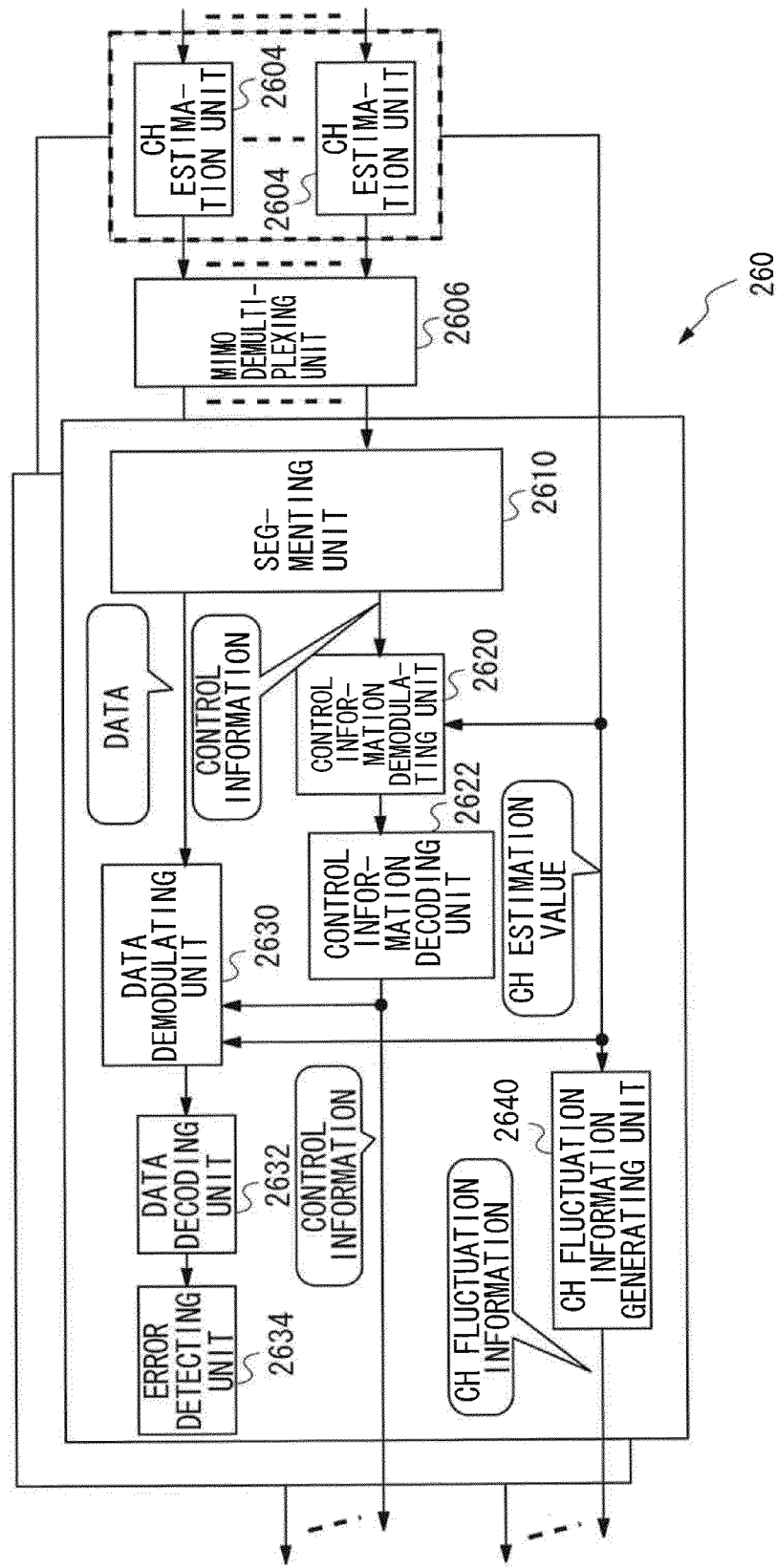
FIG. 10 is a diagram illustrating an example of a configuration of the uplink transmission frame decoding unit of the base transceiver station in the third embodiment.
Figure 11:
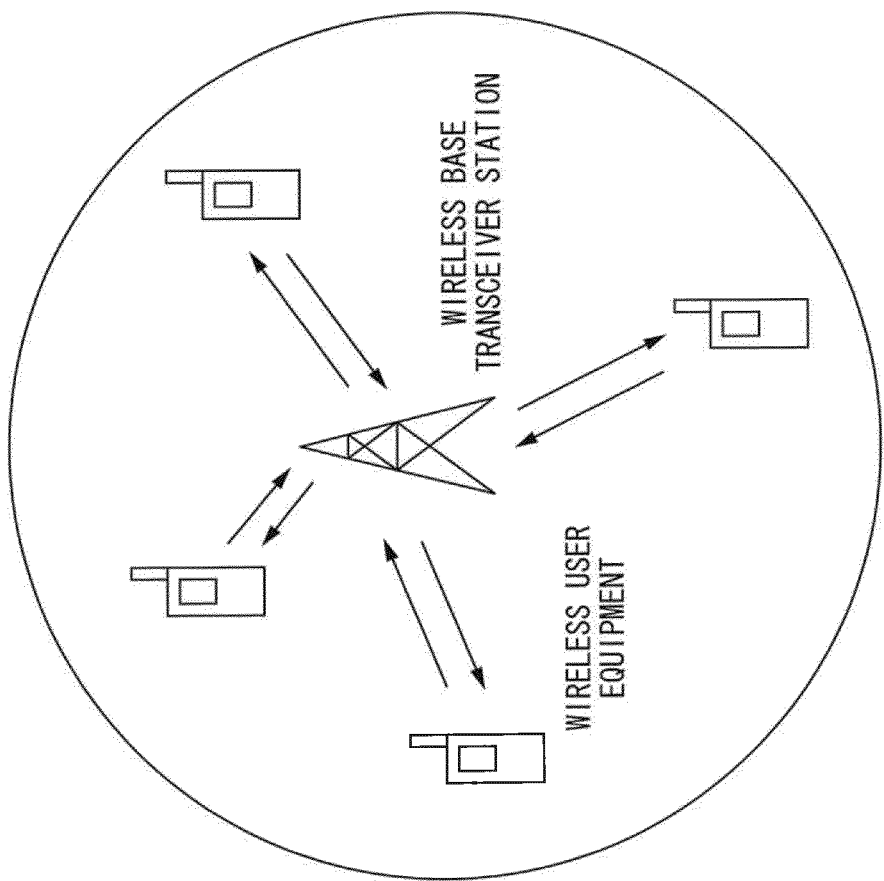
FIG. 11 is a diagram illustrating an example of a wireless communication system performing bidirectional communications.
Figure 12:
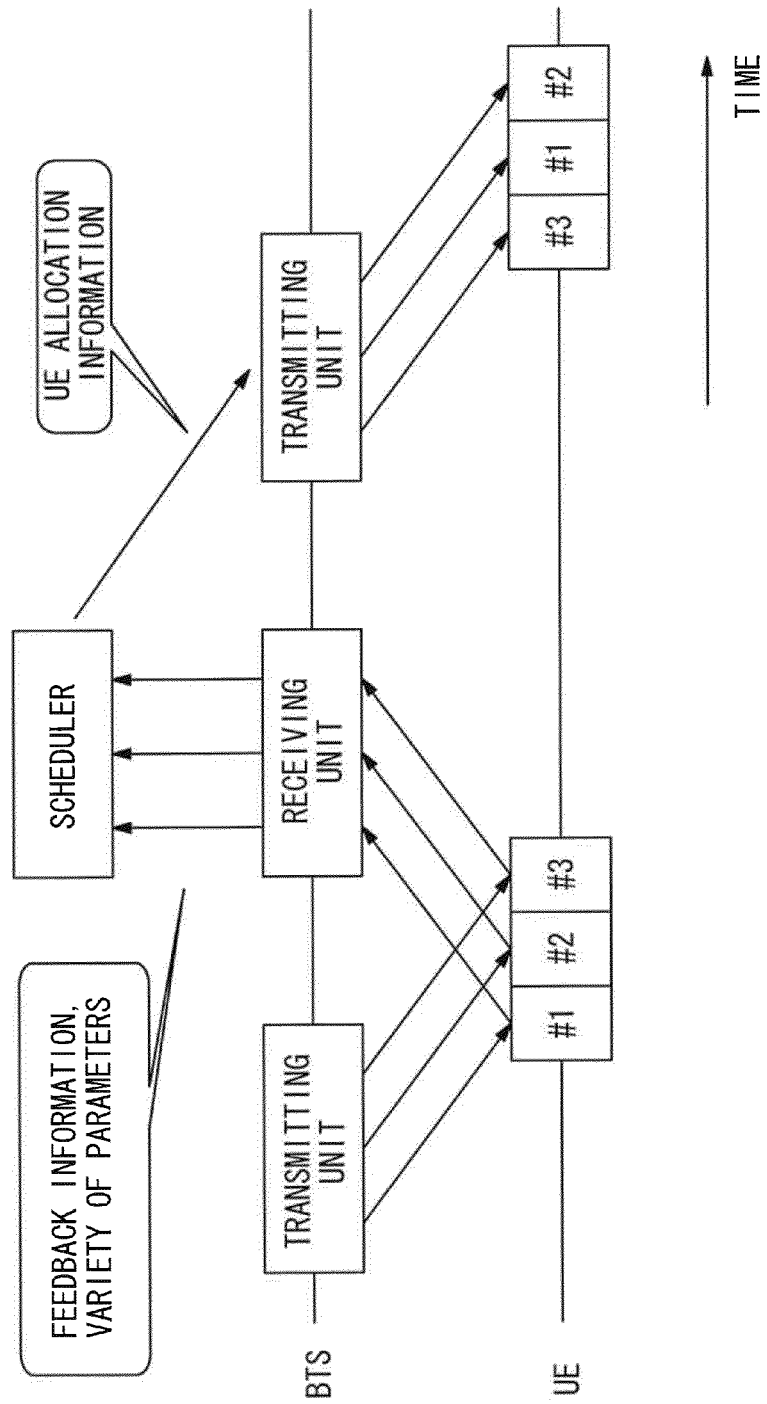
FIG. 12 is a diagram illustrating how a scheduler of the base transceiver station controls the communications between the user equipment and the base transceiver station.

FIG. 10 is a diagram illustrating an example of a configuration of an uplink transmission frame decoding unit of the base transceiver station in the third embodiment. The uplink transmission frame decoding unit 260 of the base transceiver station 200 in the third embodiment includes the channel (CH) estimation unit 2604, the MIMO demultiplexing unit 2606, the segmenting unit 2610, the control information demodulating unit 2620, the control information decoding unit 2622, the data demodulating unit 2630, the data decoding unit 2632, the error detecting unit 2634 and a channel (CH) fluctuation information generating unit 2640.

The channel fluctuation information generating unit 2640 obtains the channel (CH) fluctuation information (propagation path fluctuation value) from the channel estimation value calculated by the channel estimation unit 2604. The channel fluctuation information generating unit 2640 transmits the channel fluctuation information (propagation path fluctuation value) to the scheduler 250 or the channel fluctuation prediction unit 280.

Operational Example

An operational example of the scheduler 250 is the same as the operational example of the scheduler 250 illustrated in FIG. 4 in the first embodiment and the operational example of the scheduler 250 illustrated in FIG. 7 in the second embodiment.

The scheduler 250 performs scheduling by using the propagation path fluctuation value calculated by the uplink transmission frame decoding unit 260 or the channel fluctuation prediction unit 280.

<Operation and Effect of the Embodiment>

According to the third embodiment, the propagation path fluctuation value is calculated on the side of the base transceiver station, whereby it is unnecessary for the user equipment to create the control information containing the propagation path fluctuation value.

According to the third embodiment, the user equipment does not calculate the propagation path fluctuation value, and hence the hardware configuration of the user equipment can be simplified.

What is claimed is:

1. A communication control method in a base transceiver station communicating with user equipment, comprising:
   receiving an uplink transmission signal containing a propagation path fluctuation value between the base transceiver station and the user equipment from the user equipment; and
   controlling a period of time during which a permission of communications is given to the user equipment based on the propagation path fluctuation value,
   giving no permission of the communications to the user equipment when the propagation path fluctuation value exceeds a second specified value larger than a first specified value and giving no permission of the communications to the user equipment other than the user equipment satisfying a predetermined condition when the propagation path fluctuation value is equal to or smaller than the first specified value, while giving the permission of the communications to the user equipment when the propagation path fluctuation value exceeds the first specified value but is equal to or smaller than the second specified value, and
   giving the permission of the communications to the user equipment that has not been given the permission of the communication for a specified period of time or longer.

2. A base transceiver station communicating with user equipment, the base transceiver station comprising:
   a receiver to receive an uplink transmission signal containing a propagation path fluctuation value between the base transceiver station and the user equipment from the user equipment; and
   a scheduler to control a period of time during which a permission of communications is given to the user equipment based on the propagation path fluctuation value, and
   wherein the scheduler does not give the permission of the communications to the user equipment when the propagation path fluctuation value exceeds a second specified value larger than a first specified value and does not give the permission of the communications to the user equipment other than the user equipment satisfying a predetermined condition when the propagation path fluctuation value is equal to or smaller than the first specified value, while the scheduler gives the permission of the communications to the user equipment when the propagation path fluctuation value exceeds the first specified value but is equal to or smaller than the second specified value, and
   wherein the scheduler gives the permission of the communications to the user equipment that has not been given the permission of the communication for a specified period of time or longer.

3. The base transceiver station according to claim 2, wherein the scheduler includes a storage unit, stores information of the user equipment in the storage unit when the propagation path fluctuation value is equal to or smaller than the first specified value, extracts the information of the user equipment given none of the permission of the communication for a specified period of time or longer from the information of the user equipment that is stored in the storage unit, and gives the permission of the communications to the user equipment given none of the permission of the communications for the longest period of time in the extracted pieces of user equipment.

4. The base transceiver station according to claim 2, further comprising:
   a propagation path fluctuation value storage unit to be stored with the past propagation path fluctuation values; and
   a propagation path fluctuation value predicting unit to predict and to calculate the present propagation path fluctuation value based on the past propagation path fluctuation values stored in the propagation path fluctuation value storage unit, wherein the scheduler gives the permission of the communications to the user equipment based on the propagation path fluctuation value predicted by the propagation path fluctuation value predicting unit.

5. A base transceiver station communicating in a way that switches over user equipment as a communication destination by giving a permission of communications to the user equipment, the base transceiver station comprising:
- a receiver to receive, from the user equipment, an uplink transmission signal containing a propagation path fluctuation value between the base transceiver station and user equipment;
- a propagation path fluctuation value calculating unit to calculate the propagation path fluctuation value between the user equipment and the base transceiver station by use of the uplink transmission signal; and
- a scheduler to control a period of time during which a permission of communications is given to the user equipment based on the propagation path fluctuation value, and
- wherein the scheduler does not give the permission of the communications to the user equipment when the propagation path fluctuation value exceeds a second specified value larger than a first specified value and does not give the permission of the communications to the user equipment other than the user equipment satisfying a predetermined condition when the propagation path fluctuation value is equal to or smaller than the first specified value, while the scheduler gives the permission of the communications to the user equipment when the propagation path fluctuation value exceeds the first specified value but is equal to or smaller than the second specified value, and
- wherein the scheduler gives the permission of the communications to the user equipment that has not been given the permission of the communication for a specified period of time or longer.

6. The base transceiver station according to claim 5, wherein the scheduler includes a storage unit, stores information of the user equipment in the storage unit when the propagation path fluctuation value is equal to or smaller than the first specified value, extracts the information of the user equipment given none of the permission of the communication for a specified period of time or longer from the information of the user equipment that is stored in the storage unit, and gives the permission of the communications to the user equipment given none of the permission of the communications for the longest period of time in the extracted pieces of user equipment.

7. The base transceiver station according to claim 5, further comprising:
- a propagation path fluctuation value storage unit to be stored with the past propagation path fluctuation values; and
- a propagation path fluctuation value predicting unit to predict and to calculate the present propagation path fluctuation value based on the past propagation path fluctuation values stored in the propagation path fluctuation value storage unit,
- wherein the scheduler gives the permission of the communications to the user equipment based on the propagation path fluctuation value predicted by the propagation path fluctuation value predicting unit.

* * * * *